(12) United States Patent
Zhao

(10) Patent No.: US 9,104,520 B2
(45) Date of Patent: Aug. 11, 2015

(54) METHOD AND APPARATUS FOR UPGRADING APPLICATION

(71) Applicant: Zhihong Zhao, Shenzhen (CN)

(72) Inventor: Zhihong Zhao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 59 days.

(21) Appl. No.: 13/993,608

(22) PCT Filed: Apr. 28, 2013

(86) PCT No.: PCT/CN2013/074972
§ 371 (c)(1),
(2) Date: Jun. 12, 2013

(87) PCT Pub. No.: WO2014/176731
PCT Pub. Date: Nov. 6, 2014

(65) Prior Publication Data
US 2014/0325497 A1    Oct. 30, 2014

(51) Int. Cl.
*G06F 9/44* (2006.01)
*G06F 9/445* (2006.01)

(52) U.S. Cl.
CPC ........................ *G06F 8/65* (2013.01)

(58) Field of Classification Search
CPC ........................................... G06F 8/65

USPC ........................................... 717/169
See application file for complete search history.

(56) References Cited

U.S. PATENT DOCUMENTS

| | | | |
|---|---|---|---|
| 2006/0048138 A1* | 3/2006 | Boctor et al. | 717/174 |
| 2006/0136895 A1* | 6/2006 | Barr et al. | 717/168 |
| 2006/0161914 A1* | 7/2006 | Morrison et al. | 717/174 |
| 2008/0127170 A1* | 5/2008 | Goldman et al. | 717/174 |

OTHER PUBLICATIONS

"System and Method for Packaging Incremental Updates to Software"; An IP.com Prior Art Database Technical Disclosure; Nov. 10, 2006.*
"ZIP (File Format)"; Wikipedia.org website; Apr. 21, 2013.*

* cited by examiner

*Primary Examiner* — Qing Chen
*Assistant Examiner* — Clint Thatcher
(74) *Attorney, Agent, or Firm* — Blakely Sokoloff Taylor & Zafman LLP

(57) ABSTRACT

The present invention provides a method for upgrading an application, and the method includes: obtaining a patch package corresponding to a current installation package of an application; removing a customized information portion from the current installation package and obtaining a data portion of the current installation package; generating a data portion of a new installation package according to the patch package and the data portion of the current installation package; obtaining the new installation package by adding the customized information portion to the data portion and the new installation package; installing the new installation package.

20 Claims, 6 Drawing Sheets

METHOD AND APPARATUS FOR UPGRADING APPLICATION

CLAIM OF PRIORITY

This application is a U.S. National Phase application under 35 U.S.C. §371 of International Application No. PCT/CN2013/074972, filed Apr. 28, 2013, entitled "METHOD, AND APPARATUS FOR UPGRADING APPLICATION" the entire contents of which are incorporated herein by reference.

FIELD OF THE INVENTION

The present invention relates to mobile communication technologies, more particularly, to a method and apparatus for upgrading an application.

BACKGROUND OF THE INVENTION

Along with the developments of mobile communication technologies, various applications are provided for mobile terminals. Since more and more functions of the application are developed, an installation package of the application is growing, and an upgrade process of the application needs more time and traffic. For the purpose of reducing the traffic and shorten the time when the application is upgraded in the mobile terminal, increment upgrade solutions are widely used currently.

In the increment upgrade solution, an old installation package and a new installation package are both binary file, differences between the old installation package and the new installation package are found out by using a bsdiff tool, and a patch package is obtained. The mobile terminal downloads the patch package, generates the new installation package by using a bspatch tool according to the old installation package stored in the mobile terminal and the downloaded patch package. Because the bsdiff algorithm is based on difference operation for binary files, any change of the old installation package or the new installation package will bring a different patch package.

Currently, the installation package of the application includes a data portion and a customized information portion. The bsdiff algorithm is performed only for the data portion, and the customized information portion is used to indicate various customized information, such as, a release channel of the installation package. That is, the same version of application may have different installation packages with the same data portion and different customized information portions. Accordingly, once the application is to be upgraded to a higher version, many patch packages with different customized information are needed. For example, when the application has 100 release channels, e.g. an official channel, an IE and a 360 browser and etc., 100 different patch packages with the same data portion needs to be provided, which results in heavy workload for developers.

As can be seen, in the conventional patch upgrade solution, when the application is to be upgraded to a new version, the data portion the developer has to provide a lot of patch packages corresponding to different customized information portions respectively, although the data portion for the new version of the application is unchanged.

SUMMARY OF THE INVENTION

In view of the above, the embodiments of the present invention provide a method and apparatus for upgrading an application, so as to avoid providing too many patch packages for the same version of application.

Technical solutions are implemented as following.

A method for upgrading an application comprises:
obtaining a patch package corresponding to a current installation package of an application;
removing a customized information portion from the current installation package and obtaining a data portion of the current installation package;
generating a data portion of a new installation package according to the patch package and the data portion of the current installation package;
obtaining the new installation package by adding the customized information portion to the data portion and the new installation package;
installing the new installation package.

A method for upgrading an application, comprising:
removing a customized information portion from an old installation package of an application and obtaining a data portion of the old installation package;
removing a customized information portion from a new installation package of the application and obtaining a data portion of the new installation package;
generating a patch package according to the data portion of the old installation package and data portion of the new installation package.

A non-transitory computer readable medium storing instructions thereon for upgrading an application, the instructions when executed by a processor cause the processor to:
obtain a patch package corresponding to a current installation package of an application;
remove a customized information portion from the current installation package and obtain a data portion of the current installation package;
generate a data portion of a new installation package according to the patch package and the data portion of the current installation package;
obtain the new installation package by adding the customized information portion to the data portion and the new installation package;
install the new installation package.

A non-transitory computer readable medium storing instructions thereon for upgrading an application, the instructions when executed by a processor cause the processor to
remove a customized information portion from an old installation package of an application and obtaining a data portion of the old installation package;
remove a customized information portion from a new installation package of the application and obtaining a data portion of the new installation package;
generate a patch package according to the data portion of the old installation package and data portion of the new installation package.

A storage apparatus for storing an installation package of an application, comprising:
a first storing module, to store a data portion of a current installation package of an application before the application is upgraded; and to store a data portion of a new installation package after the application is upgraded; the data portion of the new installation package being generated according the data portion of the current installation package and a patch package for upgrading the application;
a second storing module, to store a customized information portion of the current installation package before and after the application is upgraded.

As can be seen from the above solutions, according to the embodiments of the present invention, by adding the customized information into the extension field, even when there are various customized information, only one patch package is provided for the new version of the application, rather than providing too may patch packages corresponding to each of the various customized information portions. Hence, the workloads of the developer are reduced, and it is much easy to maintain the application.

Further, because signature verification is merely performed for the data portion, different customized information portion in the patch package will not affect the signature verification, therefore avoiding failure of the signature verification.

Moreover, the mode for generating the new installation package is selected according to memory resources of the mobile terminal. Therefore, when the memory resources are enough, the old installation package and the patch package are stored into the memory, and the new installation package is generated rapidly. When the memory resources are not enough, some of the old installation package and some of the patch package are stored into the memory orderly, so that the memory is utilized reasonably, and abnormal procedure of the memory is avoided.

BRIEF DESCRIPTION OF THE DRAWINGS

Specific examples of the present invention will be illustrated in detail hereinafter with reference to the accompanying drawings, so that the above and other characteristics and merits of the present invention are clearer for those skilled in the art.

DETAILED DESCRIPTION OF THE INVENTION

The embodiments of the present invention provide a method and apparatus for upgrading an application, so as to avoid providing too many patch packages for the same version of application, and reduce workload of the developer.

In order to make the object, technical solution and merits of the present invention clearer, the present invention will be illustrated in detail hereinafter with reference to the accompanying drawings and specific examples.

Figure 1:
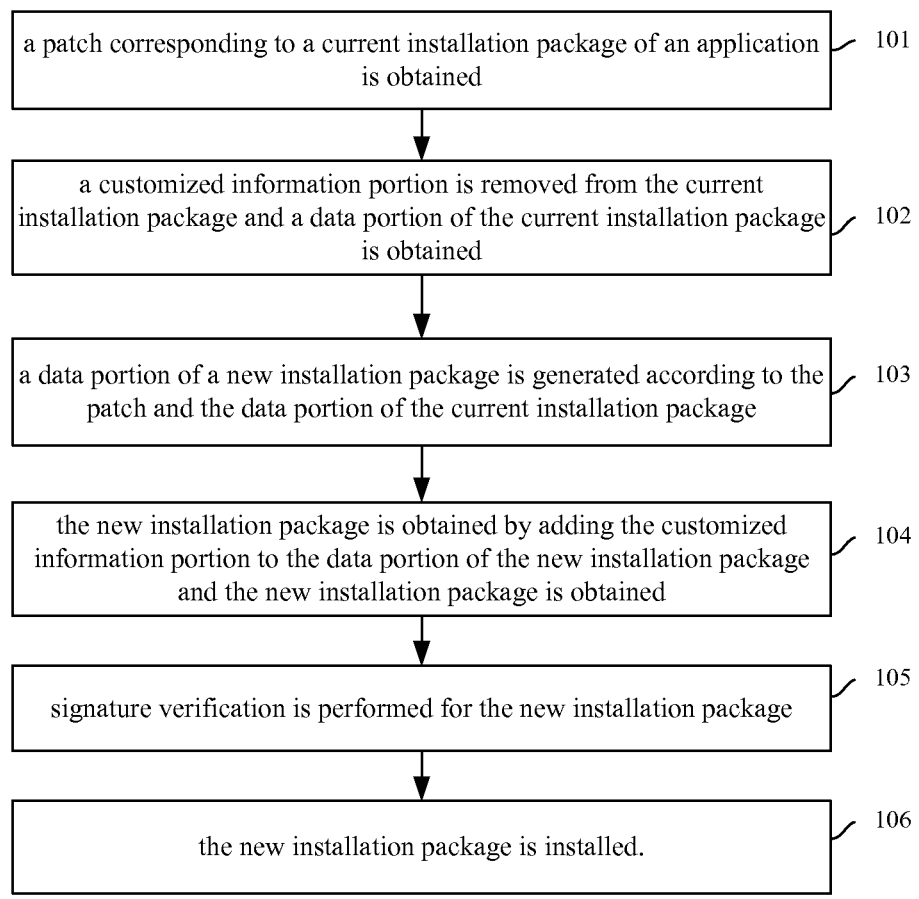
FIG. 1 is a schematic flowchart illustrating a method for upgrading an application according to an embodiment of the present invention.

FIG. 1 is a schematic flowchart illustrating a method for upgrading an application according to an embodiment of the present invention. In the following examples, the patch package is called as patch for short.

As shown in FIG. 1, the method includes the following blocks.

In block 101, a patch corresponding to a current installation package of an application is obtained.

In examples of the present invention, the patch may be obtained via various modes. For example, the patch may be obtained from a mobile device via Bluetooth or may be obtained from a computer via a USB interface. When the patch is requested from a server via the Internet, the operations are described in FIG. 2.

In block 102, a customized information portion is removed from the current installation package and a data portion of the current installation package is obtained.

The customized information portion comprises at least one of a release channel of the application, a network traffic tip, an update mode or a link to the release channel.

According to examples of the present invention, the customized information is included in a certain field that does not participate in signature verification during the installing of the application.

In an example, when the application is developed for Java platform, the installation package may be a zip file, and the customized information is included in a comment field of the zip file.

The structure of the zip file includes: A file header+B file data+C data descriptor+ . . . (repeat)+A file header+B file data+C data descriptor+D archive decoder header+E Archive extra data record+F Central directory structure+G Zip64 ending of the central directory record+H Zip64 ending of the central directory locator+I ending of the central directory. The comment filed is included in I ending of the central directory. Based on the above structure, the length of the zip file is not limited, and thus the original contents of zip file will not be affected if customized information is added into the comment field, and conventional processing for the zip file still can be used. For example, the comment field does not participate in the signature verification when the application is upgraded, so that the content change of the comment field will not bring the signature verification failure.

When the application is developed for Android platform, the installation package may be an apk file which is provided based on the format of the zip file, and the customized information is included in an extension field of the apk file. In the conventional apk file, the extension field corresponds to the comment field in the zip file and is usually null. When the application is upgraded, the extension field does not participate in the signature verification, and the content change of the extension field will not bring the signature verification failure.

In block 103, a data portion of a new installation package is generated according to the patch and the data portion of the current installation package.

In the examples of the present invention, the current installation package and the patch are binary files, and a bspatch algorithm is used to obtain the data portion of the new installation package. In practical applications, other algorithms may be used, which is not limited is the present invention.

The generation of the data portion of the new installation package is implemented in the memory of a device terminal In an example, the generation of data portion of the new installation package may be performed in a quick mode. All of data portions of the current installation package are read into a memory and all data of the patch is read into the memory, and then the data portion of the new installation package is generated by using a bspatch algorithm.

The memory resources are very valuable, especially for the mobile terminal. For the purpose of saving memory resources and avoiding installation error when the memory resources is not enough, the generation of data portion of the new installation package may be performed in a saving mode.

In the saving mode, in each read operation, a preset length of the data portion of the current installation package is read into the memory, and a preset length of the patch corresponding to the current installation package is read into the memory. A part of the data portion of the new installation package is generated according to the read data in each read operation. The above operation is performed repeatedly until all parts of the data portion of the new installation package are generated. Finally, the data portion of the new installation package is obtained by combining each part of the data portion of the new installation package.

In practical applications, whether to use the quick mode may be determined according to current memory resources of the device terminal, when the current memory resource is enough, the quick mode is used; otherwise, the saving mode is used. In addition, a default mode may be configured for a certain device terminal. For example, if the version of the application platform is higher than Android 4.0, the quick mode is used; otherwise, the saving mode is used.

In block 104, the new installation package is obtained by adding the customized information portion to the data portion of the new installation package and the new installation package is obtained.

In this block, the customized information portion removed in block 102 is added to the data portion of the new installation package.

In block 105, signature verification is performed for the new installation package.

In the example, the signature verification is performed for ensure that the signature of the new installation package is identical with the signature of the old installation package. As described in block 102, the customized information does not participate in the signature verification, and the signature verification result will not be changed.

In block 106, the new installation package is installed. After the new installation package is installed successfully, the upgrade of the application is finished.

Figure 2:
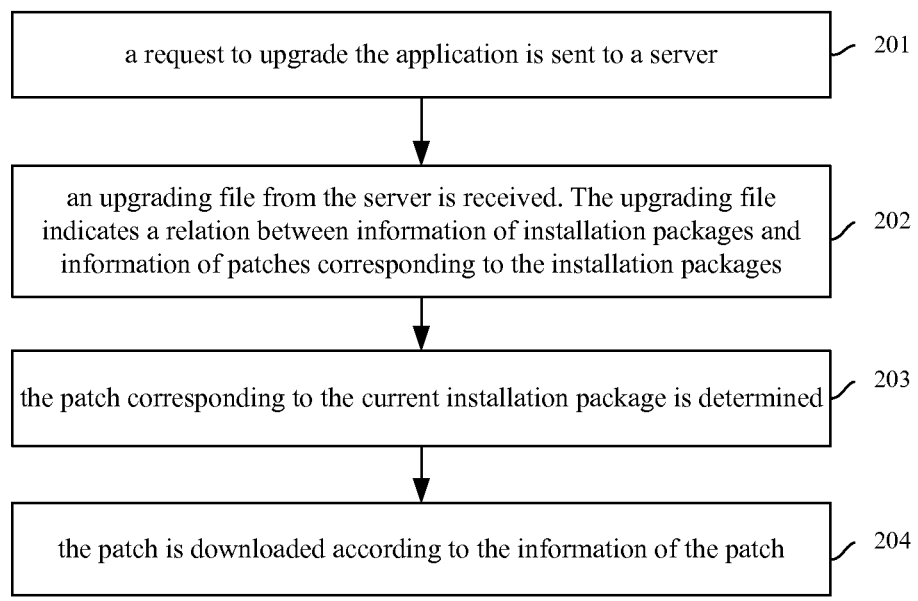
FIG. 2 is a schematic flowchart illustrating a procedure of obtaining a patch according to an embodiment of the present invention.

FIG. 2 is a schematic flowchart illustrating a procedure of obtaining a patch according to an embodiment of the present invention. As shown in FIG. 2, the procedure includes the following blocks.

In block 201, a request to upgrade the application is sent to a server.

When the application needs to be upgraded, a client terminal of the application may inform a user of that there is a new version via popping-up a dialog box, after receiving a confirm from the user, the client terminal may send the request to the server of the application.

In block 202, an upgrading file from the server is received. The upgrading file indicates a relation between information of installation packages and information of patches corresponding to the installation packages.

In an example of the present invention, the information of the installation package includes a Message-Digest Algorithm 5 (md5) value of the installation package, and information of the patch comprises an md5 value of the patch and a download address of the patch.

In block 203, the patch corresponding to the current installation package is determined In this block, the md5 value of the current installation package is obtained firstly. Specifically, the md5 value of the current installation package may be obtained by performing the md5 for the current installation package; or the md5 value of the current installation package may be obtained from the customized information in the current installation package. According to the md5 value of the current installation package, the md5 values of the installation packages in the relation are searched, and the patch corresponding to the current installation package is determined when the md5 value of the current installation package is identical with the md5 value of one of the installation package in the relation.

In block 204, the patch is downloaded according to the information of the patch.

After the md5 value of the patch corresponding to the current installation package is determined, the download address of the patch is obtained from the relation, and then the patch is downloaded according to the download address.

Figure 3:
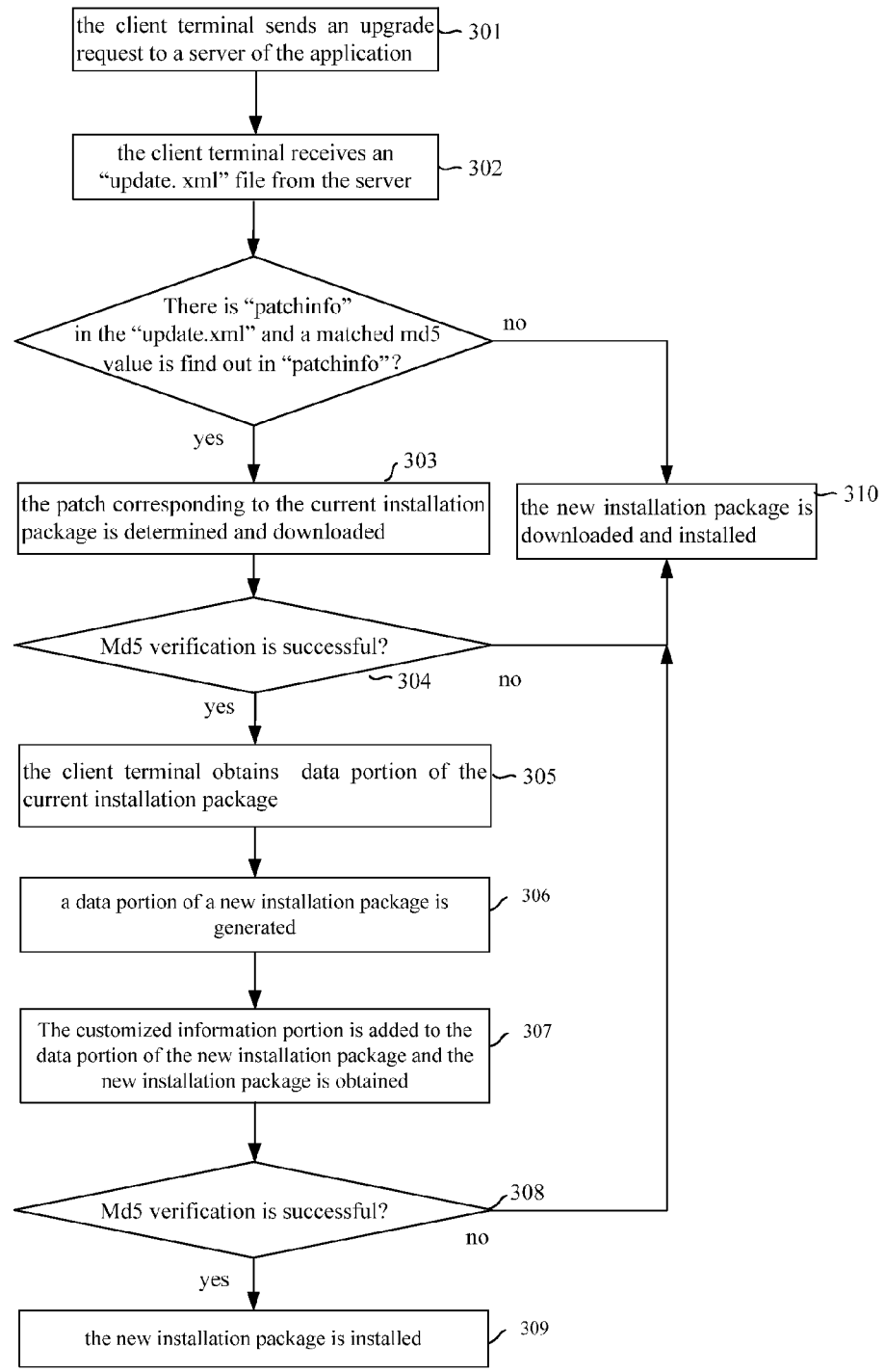
FIG. 3 is a schematic flowchart illustrating a method for upgrading an application according to another embodiment of the present invention.

FIG. 3 is a schematic flowchart illustrating a method for upgrading an application according to another embodiment of the present invention.

Figure 4:
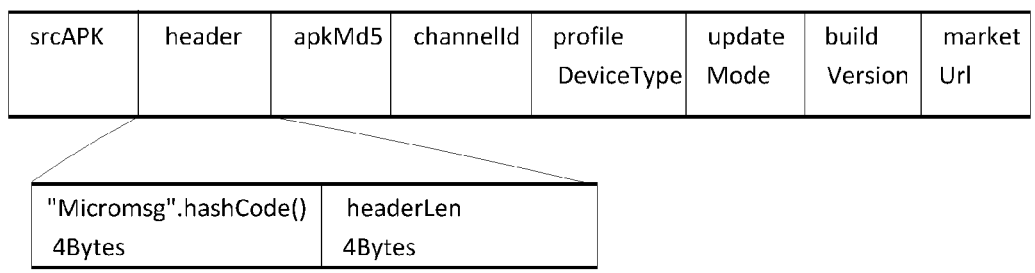
FIG. 4 is a schematic diagram illustrating the structure of the extension field of an apk file according to an embodiment of the present invention.

In this example, an application installed in a mobile phone with an android system is taken as an example, an installation package is an apk file, a customized information portion is included in an extension filed of the apk file, and the structure of the extension field of apk file is shown in FIG. 4.

According to FIG. 4, customized information included in the extension field includes: an md5 value of the apk file ("apk md5"), a release channel ("channelId"), a device type ("profile device type"), an update mode ("update mode"), a build version ("build version"), and an address of a market ("market url").

The structure of the extension field shown in FIG. 4 is only an example of the present invention, and in practical applications, the customized information in the extension field may be configured according to practical requirement, which is not limited in the present invention.

As shown in FIG. 1, the method includes the following blocks.

In block 301, a client terminal of the application pops up a dialog box to indicate that the application has a new version. After a user decides to upgrade the application via click a confirm button, the client terminal sends an upgrade request to a server of the application.

In block 302, the client terminal receives an "update.xml" file from the server.

In the example, information related to upgrade configuration, i.e. "patchinfo" is added into the "update.xml" to record a relation between md5 values of installation packages, md5 values of patches corresponding to the installation packages and download addresses of the patch. The contents of the "patchinfo" include:

```
<patchupdate base="http://dldir1.qq.com/foxmail/" count="" >
<item
old = "a751c6aa555178926395b514d56e2ecb"
new = "45030418cdbda98980effb3e915a18ac"
patch = "4f1cd66f622a3fd711b85c08f2bac556"
url = "patch1"
size = "19965">
   </item>
......
<item ......</item>
</patchupdate>
```

Herein, "old" indicates the $md5_{value}$ of an old installation package, "new" indicates the $md5_{value}$ of a new installation package, "patch" indicates the $md5_{value}$ of a patch. "base"+"url" indicates the download address of the patch.

In block 303, When there is "patchinfo" in the "update.xml" and a matched md5 value is find out in "patchinfo", the patch corresponding to the current installation package is determined and downloaded.

In the example, the client terminal reads the md5 value of the current installation package from the extension filed of the apk file, compares the md5 value of the current installation package with the md5 value of the old installation package in the "update.xml".

When there is "patchinfo" in the "update.xml" and a matched md5 value is find out in "patchinfo", the patch corresponding to the matched md5 value is determined as the patch corresponding to the current installation package; otherwise, step 310 is performed.

The client terminal also obtains the download address of the patch from the "patchinfo", and downloads the patch from the download address.

In block 304, md5 verification is performed for the downloaded patch, if the md5 verification is successful, block 305 is performed; otherwise, block 310 is performed.

In block 305, the client terminal obtains the current installation package and removes the customized information portion from the current installation package to obtain data portion of the current installation package.

In the example, the client terminal obtains the apk file of the current installation package from a directory: /data/app/ of the android system, removes the extension field from the apk file and obtain data portion of the current installation package.

In block 306, a data portion of a new installation package is generated according to the patch and the data portion of the current installation package.

In the example, a bspatch algorithm is used to obtain the data portion of the new installation package according to the data portion obtained in block 304 and the patch obtained in block 303.

It is supposed that the android system used in the mobile terminal is lower than version 4.0, and a saving mode is used.

Figure 5:
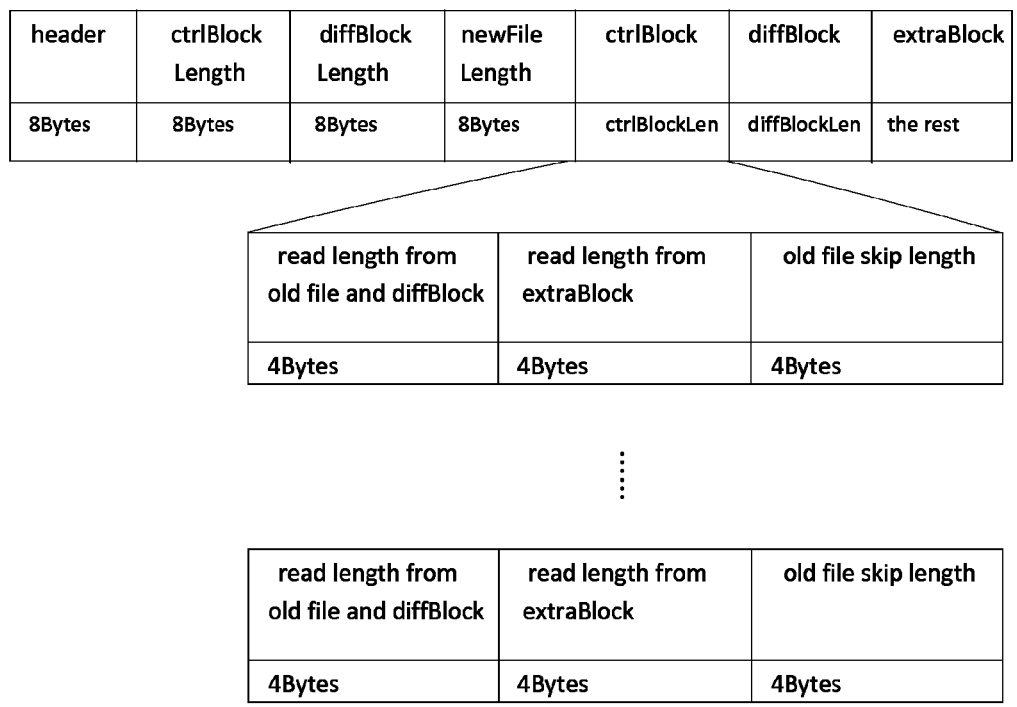
FIG. 5 is a schematic diagram illustrating the structure of the structure of the patch file according to an embodiment of the present invention.

The structure of the patch file is shown in FIG. 5. As shown in FIG. 5, the "ctrlBlock" consists of n sub-blocks, and each of the sub-blocks records a length to be read from the old apk file and the "diffBlock" in the patch file ("read length from old file and diffBlock"), a length to be read from "extra block" ("read length from extraBlock"), and a length to be skipped in the old apk file ("old file skip length").

In the example, in each read operation, the data indicated by each of the sub-blocks may be read into the memory, and the bspatch algorithm is performed only for the data read in the read operation to obtain a port of the data portion of the new installation package. After the above operations are performed for n times, the data portion of the new installation package is obtained by combining each part of the data portion of the new installation package.

In the quick mode, the data indicated by all sub-blocks are read into the memory, and the bspatch algorithm is performed once to obtain the data portion of the new installation package, which costs less time but needs more memory resources.

In block 307, the customized information portion is added to the data portion of the new installation package and the new installation package is obtained.

In the example, the extension filed shown in FIG. 4 is added to the data portion obtained in block 305, and the new installation package is obtained.

In block 308, md5 verification is performed for the new installation package obtained in block 307. If the md5 verification is successful, block 309 is performed, otherwise, block 310 is performed.

In block 309, the new installation package is installed.

In block 310, the new installation package is downloaded and installed.

The solutions for downloading the new installation package is well known for those skilled in the art and will not described herein.

After the new installation package is installed successfully, the upgrade of the application is finished.

As can be seen from the above solutions, according to the embodiments of the present invention, by adding the customized information into the extension field, even when there are various customized information, only one patch package is provided for the new version of the application, rather than providing too may patch packages corresponding to each of the various customized information portions. Hence, the workloads of the developer are reduced, and it is much easy to maintain the application.

Further, because signature verification is merely performed for the data portion, different customized information portion in the patch package will not affect the signature verification, therefore avoiding failure of the signature verification.

Moreover, the mode for generating the new installation package is selected according to memory resources of the mobile terminal Therefore, when the memory resources are enough, the old installation package and the patch package are stored into the memory, and the new installation package is generated rapidly. When the memory resources are not enough, some of the old installation package and some of the patch package are stored into the memory orderly, so that the memory is utilized reasonably, and abnormal procedure of the memory is avoided.

In addition, the examples of the present invention also provide a method for upgrading an application for the server side to generate the patch package.

Figure 6:
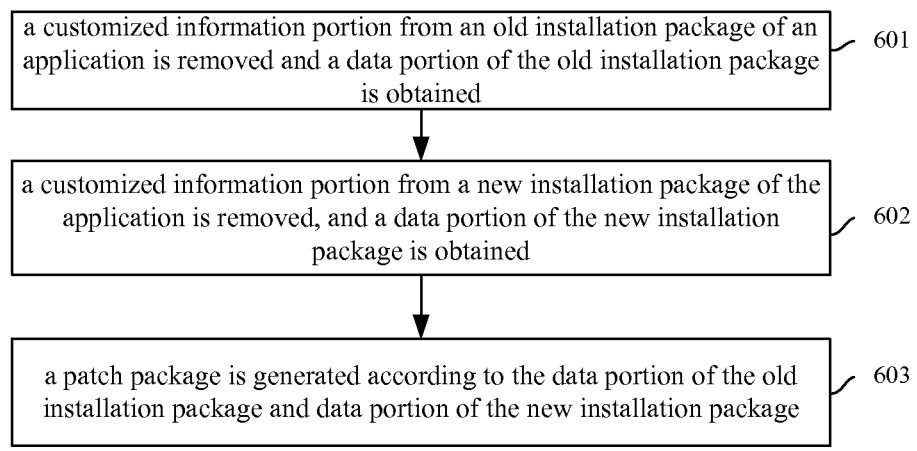
FIG. 6 is a schematic flowchart illustrating a method for upgrading an application according to another embodiment of the present invention.

FIG. 6 is a schematic flowchart illustrating a method for upgrading an application according to another embodiment of the present invention. As shown in FIG. 6, the procedure includes the following blocks.

In block 601, a customized information portion from an old installation package of an application is removed and a data portion of the old installation package is obtained.

The customized information portion comprises at least one of a release channel of the application, a network traffic tip, an update mode or a link to the release channel.

In block 602, a customized information portion from a new installation package of the application is removed, and a data portion of the new installation package is obtained.

In block 603, a patch package is generated according to the data portion of the old installation package and data portion of the new installation package.

In an example of the present invention, a bsdiff algorithm is used to obtain the patch package.

As can be seen from the above solutions, according to the embodiments of the present invention, by adding the customized information into the extension field, even when there are various customized information, only one patch package is provided for the new version of the application, rather than providing too may patch packages corresponding to each of the various customized information portions. Hence, the workloads of the developer are reduced, and it is much easy to maintain the application.

Moreover, the examples of the present invention further provide a storage apparatus for storing an installation package of an application. The storage apparatus includes a first storing module and a second storing module.

The first storing module is to store a data portion of a current installation package of an application before the application is upgraded; and to store a data portion of a new installation package after the application is upgraded. The data portion of the new installation package is generated according the data portion of the current installation package and a patch package for upgrading the application.

The second storing module is to store a customized information portion of the current installation package before and after the application is upgraded.

In an example of the present invention, when the current installation package is a zip file, the customized information is comprised in a comment field of the zip file.

In an example of the present invention, when the current installation package is an apk file, the customized information is comprised in a comment field of the apk file.

In an example of the present invention, the customized information portion comprises at least one of a release channel of the application, a network traffic tip, an update mode or a link to the release channel.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in storage in an extension board inserted in the computer or in storage in an extension unit connected to the computer. In this example, a CPU in the extension board or the extension unit executes at least part of the operations according to the instructions based on the program codes to realize a technical scheme of any of the above examples.

The foregoing is only preferred examples of the present invention and is not used to limit the protection scope of the present invention. Any modification, equivalent substitution and improvement without departing from the spirit and principle of the present invention are within the protection scope of the present invention.

What is claimed:

1. A method for upgrading an application, comprising: obtaining a patch package corresponding to a current installation package of an application; removing a customized information portion from the current installation package and obtaining a data portion of the current installation package; generating a data portion of a new installation package according to the patch package and the data portion of the current installation package; obtaining the new installation package by adding the customized information portion to the data portion of the new installation package; and installing the new installation package.

2. The method according to claim 1, wherein obtaining a patch package corresponding to an old installation package of an application comprises: sending a request to upgrade the application; receiving a upgrading file; the upgrading file indicating a relation between information of installation packages and information of patches corresponding to the installation packages; determining the patch package corresponding to the current installation package; downloading the patch package according to the information of the patch.

3. The method according to claim 1, wherein the information of the installation package comprises a Message-Digest Algorithm 5 (md5) value of the installation package, and information of the patch package comprises a md5 value of the patch package and a download address of the patch package; determining the patch package corresponding to the current installation package comprises: obtaining an md5 value of the current installation package; determining the patch package corresponding to the current installation package according to the relation when the md5 value of the current installation package is identical with the md5 value of one of the installation package in the relation.

4. The method according to claim 3, wherein the md5 value of the current installation package is obtained by performing the md5 for the current installation.

5. The method according to claim 3, wherein the md5 value of the current installation package is obtained from the customized information of the current installation package.

6. The method according to claim 1, wherein when the current installation package is a zip file, the customized information is comprised in a comment field of the zip file; or when the current installation package is an apk file, the customized information is comprised in a comment field of the apk file.

7. The method according to claim 1, wherein generating a data portion of a new installation package according to the patch package and the data portion of the current installation package comprises: reading all of the data portion of the current installation package into a memory, and reading all of the patch into the memory; generating the data portion of the new installation package in the memory.

8. The method according to claim 1, wherein generating a data portion of a new installation package according to the patch and the data portion of the current installation package comprises: reading a preset length of the data portion of the current installation package into a memory and reading a preset length of the patch into the memory, in each read operation; generating a part of the data portion of the new installation package according to data read in each read operation after the read operation is performed; performing the reading operation and generating operation repeatedly until all parts of the data portion of the new installation package is generated; obtaining the data portion of the new installation package by combining each part of the data portion of the new installation package.

9. A method for upgrading an application, comprising: removing a customized information portion from an old installation package of an application and obtaining a data portion of the old installation package; removing a customized information portion from a new installation package of the application and obtaining a data portion of the new installation package; generating a patch package according to the data portion of the old installation package and data portion of the new installation package so that a client terminal obtains the patch package corresponding to a current installation package of the application, removes a customized information portion from the current installation package, obtains a data portion of the current installation package, generates the data portion of the new installation package according to the patch package and the data portion of the current installation package, obtains the new installation package by adding the customized information portion to the data portion of the new installation package; and installs the new installation package.

10. A non-transitory computer readable medium storing instructions thereon for upgrading an application, the instructions when executed by a processor cause the processor to: obtain a patch package corresponding to a current installation package of an application; remove a customized information portion from the current installation package and obtain a data portion of the current installation package; generate a data portion of a new installation package according to the patch package and the data portion of the current installation package; obtain the new installation package by adding the customized information portion to the data portion of the new installation package; and install the new installation package.

11. The non-transitory computer readable medium according to claim 10, wherein the instructions when executed by the processor further cause the processor to: send a request to upgrade the application; receive a upgrading file; the upgrading file indicating a relation between information of installation packages and information of patches corresponding to the installation packages; determine the patch package corresponding to the current installation package; download the patch package according to the information of the patch.

12. The non-transitory computer readable medium according to claim 10, wherein the information of the installation package comprises a Message-Digest Algorithm 5 (md5) value of the installation package, and information of the patch comprises a md5 value of the patch and a download address of the patch; and the instructions when executed by the processor further cause the processor to: obtain an md5 value of the current installation package; determine the patch package corresponding to the current installation package according to the relation when the md5 value of the current installation package is identical with the md5 value of one of the installation package in the relation.

13. The non-transitory computer readable medium according to claim 12, wherein the md5 value of the current installation package is obtained by performing the md5 for the current installation; or the md5 value of the current installation package is obtained from the customized information of the current installation package.

14. The non-transitory computer readable medium according to claim 10, wherein when the current installation package is a zip file, the customized information is comprised in a comment field of the zip file; or when the current installation package is an apk file, the customized information is comprised in a comment field of the apk file.

15. The non-transitory computer readable medium according to claim 10, wherein the instructions when executed by the processor further cause the processor to: read all of the data portion of the current installation package into a memory, and read all of the patch into the memory; generate the data portion of the new installation package in the memory.

16. The non-transitory computer readable medium according to claim 10, wherein the instructions when executed by the processor further cause the processor to: read a preset length of the data portion of the current installation package into a memory and read a preset length of the patch into the memory, in each read operation; generate a part of the data portion of the new installation package according to data read in each read operation after the read operation is performed; perform the read operation and generating operation repeatedly until all parts of the data portion of the new installation package is generated; obtain the data portion of the new installation package by combining each part of the data portion of the new installation package.

17. A non-transitory computer readable medium storing instructions thereon for upgrading an application, the instructions when executed by a processor cause the processor to remove a customized information portion from an old installation package of an application and obtaining a data portion of the old installation package; remove a customized information portion from a new installation package of the application and obtaining a data portion of the new installation package; and generate a patch package according to the data portion of the old installation package and data portion of the new installation package so that a client terminal obtains the patch package corresponding to a current installation package of the application; removes a customized information portion from the current installation package; obtains a data portion of the current installation package, generates the data portion of the new installation package according to the patch package and the data portion of the current installation package, obtains the new installation package by adding the customized information portion to the data portion of the new installation package; and installs the new installation package.

18. A storage apparatus for storing an installation package of an application, comprising: a processor for executing modules stored in a non-transitory computer readable storage medium, the modules comprise: a first storing module, to store a data portion of a current installation package of an application before the application is upgraded; and to store a data portion of a new installation package after the application is upgraded; a customized information portion being removed from the current installation package; the data portion of the current installation package being obtained; the data portion of the new installation package being generated according the data portion of the current installation package and a patch package for upgrading the application; the patch package corresponding to the current installation package of the application being obtained; a second storing module, to store the customized information portion of the current installation package before and after the application is upgraded; the customized information portion being added to the data portion of the new installation package to obtain the new installation package; the new installation package being installed.

19. The storage apparatus according to claim 18, wherein when the current installation package is a zip file, the customized information is comprised in a comment field of the zip file.

20. The storage apparatus according to claim 18, wherein when the current installation package is an apk file, the customized information is comprised in a comment field of the apk file.

* * * * *